Figure 1:
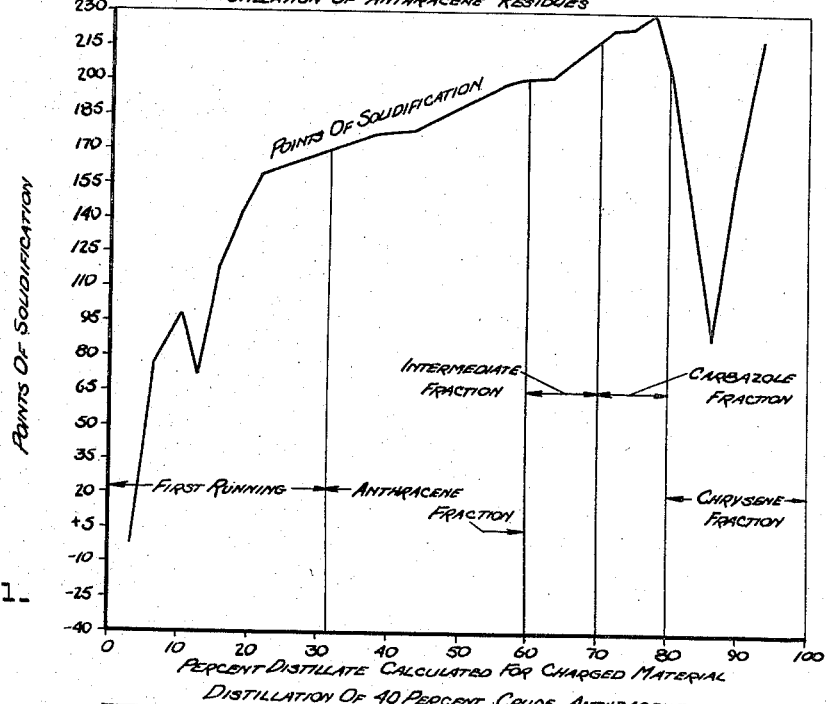

May 5, 1959  E. MOEHRLE ET AL  2,885,406
PROCESS OF PRODUCING ANTHRACENE AND CARBAZOLE
Filed Oct. 17, 1956

INVENTORS
EDUARD MOEHRLE, DECEASED
BY ELISE MOEHRLE, EXECUTRIX.
ALFRED MARX
HEINZ GERHARD FRANCK

BY
AGENT

United States Patent Office 2,885,406
Patented May 5, 1959

2,885,406

PROCESS OF PRODUCING ANTHRACENE AND CARBAZOLE

Eduard Moehrle, deceased, late of Duisburg-Meiderich, Germany, by Elise Moehrle, executrix, Duisburg, and Alfred Marx and Heinz Gerhard Franck, Duisburg-Meiderich, Germany, assignors to Gesellschaft fuer Teerverwertung m.b.H., Duisburg-Meiderich, Germany, a corporation of Germany Application October 17, 1956, Serial No. 616,444

5 Claims. (Cl. 260—318)

The present invention relates to a process of producing anthracene and carbazole from anthracene residues and crude anthracene products containing carbazole and more particularly to a process of producing anthracene and carbazole from such starting materials by way of distillation.

Heretofore, anthracene and carbazole have been recovered from residues obtained in the manufacture of anthracene or, respectively, from crude anthracene products by subjecting such starting materials to fusion with alkali hydroxide whereby carbazole is converted into its alkali metal compound, and working up the unreacted material to high-grade anthracene. Another known method of separating the two compounds from such starting materials consists in repeatedly subjecting the same to the action of selective solvents. This process is rather complicated.

None of the known processes yields fully satisfactory results because they require numerous working steps and, consequently, are time consuming and rather expensive.

It is one object of the present invention to provide a simple and effective process of separating and recovering anthracene and carbazole from anthracene residues or, respectively, mixtures of anthracene and carbazole which process permits highly selective separation of anthracene and carbazole.

Other objects of the present invention and advantageous features thereof will become apparent as the description proceeds.

In principle, the process according to the present invention consists in subjecting residues from the anthracene manufacture or, respectively, mixtures of anthracene and carbazole to fractional distillation under a vacuum between about 200 mm. Hg/sq. cm. and about 250 Torr.

Heretofore, anthracene residues have not been worked up by fractional distillation because the tendency of anthracene and carbazole to sublime prohibits vacuum distillation under the usually employed pressure conditions and the high temperatures required for distillation under atmospheric pressure render the process very costly and uneconomical. In addition thereto, such high temperatures cause partial decomposition and coking of the residue in the still.

It is quite surprising that, when proceeding according to the present invention and carrying out vacuum distillation under a vacuum between about 200 mm. Hg/sq. cm. and about 250 Torr., satisfactory and trouble-free fractional distillation is possible because, under such pressure conditions, the tendency of anthracene and carbazole to sublime is very slight. As a result thereof, no clogging of the distillation and vacuum pipes takes place while, on the other hand, the temperature within the still at such a specific vacuum is so low, namely below 300° C., that no coking or marked decomposition of the residue occurs.

In contrast to the process according to the present invention, distillation under a high vacuum of a few mm. Hg/sq. cm. causes sublimation of both compounds because the boiling points of carbazole (melting point: 245° C.) and of anthracene (melting point: 217° C.) are decreased below their points of solification. Consequently, no fractional distillation and rectification is possible when operating under a high vacuum.

It is an essential feature of the present invention that a vacuum between about 200 mm. Hg/sq. cm. and about 250 Torr. must be maintained during that period of distillation during which anthracene and carbazole pass over. The vacuum may be much higher, i.e. it may amount to a few mm. Hg/sq. cm. at the beginning of the distillation as long as phenanthrene distills off. Phenanthrene does not have the tendency to sublime and, therefore, no difficulties are encountered during its distillation.

Thus, according to a preferred embodiment of the present invention first the phenanthrene is distilled off under a high vacuum of a few Torr. not exceeding about 50 mm. Hg/sq. cm. and preferably not exceeding 20 mm. Hg/sq.cm. and is collected as first runnings. Thereafter the vacuum is decreased to a vacuum between about 200 mm Hg/sq.cm. and about 250 Torr. whereby the anthracene and carbazole fractions are distilled off and collected. Thereupon, the vacuum may again be increased because after removal of the carbazole fraction no more sublimation occurs.

The starting materials used in the process according to the present invention are, for instance, the residues obtained on anthracene manufacture which still contain anthracene and carbazole, or crude anthracene products such as 40% anthracene, i.e. a crude anthracene obtained by allowing the coal tar oil fraction known as anthracene oil to crystallize and separating the resulting crude anthracene crystals of an anthracene content of about 40%.

It is not necessary to effect complete and sharp separation of phenanthrene and anthracene when working up anthracene residues or crude anthracene products such as 40% anthracene according to the present invention. Sharp separation of said compounds by distillation is rather difficult because the difference in boiling points between said two compounds amounts only to 8° C. since the boiling point of phenanthrene is 332° C. and that of anthracene is 340° C. Complete separation of phenanthrene from anthracene by distillation would require a very large number of plates or trays in the distillation column or, respectively, a very high reflux ratio. Said number of plates or trays would be larger or, respectively, the reflux ratio would be higher than required for complete separation of anthracene from carbazole since the difference in boiling points of said two compounds amounts to 12° C. (boiling point of carbazole: 352° C.). Thus, according to a preferred embodiment of the present invention the number of plates or trays and the reflux ratio are adjusted to the number and ratio required for effecting complete separation of anthracene from carbazole and not to the number and ratio required to completely separate phenanthrene and anthracene. The initially distilling mixture of phenanthrene and anthracene can readily be separated by dissolving the mixture in a suitable solvent and allowing the solution to crystallize.

Substantially complete separation, by distillation, of anthracene and carbazole is an essential feature of the present invention because separation of said two compounds by selective dissolution is a rather complicated process and, if possible, should be avoided. Since the required number of plates and the required reflux ratio are still within an economically feasible range under a vacuum between about 200 mm. Hg/sq. cm. and about 250 mm. Hg/sq. cm. when separating, by distillation, anthracene from carbazole according to the present invention, the procedure according to this preferred embodiment yields fully satisfactory results.

According to another preferred embodiment of the present invention the distilled fractions are collected in accordance with their points of solidification.

Phenanthrene and anthracene as well as anthracene and carbazole and phenanthrene and carbazole form a continuous series of mixed crystals producing an almost linear curve of their points of solidification. Thus, when determining the curve of points of solidification of the fractions obtained on fractional distillation of anthracene residues, a continuously ascending curve is obtained on distillation of the phenanthrene fraction (melting point of phenanthrene: 100° C.) the anthracene fraction (melting point of anthracene: 217° C.), and the carbazole fraction (melting point of carbazole: 245° C.).

Since points of solidification can be determined much more exactly than boiling points which, moreover, are dependent upon other factors, it is possible to cut out the anthracene fraction and the carbazole fraction so completely by collecting said fractions according to their points of solidification that the resulting fractions can readily be worked up by means of a single recrystallization step to anthracene of an anthracene content exceeding 95% or, respectively, to 95% carbazole although the curve of solidification proceeds in almost linear progression.

Thus, according to a further preferred embodiment of the present invention the anthracene fraction and the carbazole fraction are collected according to their points of solidification in such a manner that the resulting fractions can readily be worked up by a single recrystallization step to high-grade products, namely to anthracene of an anthracene content exceeding 95% and to 95% carbazole.

It has previously been suggested to work up crude coal tar by continuous distillation to fractions of a high content of carbazole, anthracene, and phenanthrene. For this purpose the tar is first freed of low boiling components and is then distilled in two or more main columns. Thereby, those components which have a lower boiling point than phenanthrene are removed as far as possible in the lower part of a first column arranged before the other columns. The components having a higher boiling point than carbazole are then separated in the next group of columns. The vapors distilling from said second group of columns pass into the third group of columns and are separated therein in a carbazole fraction and one or several fractions which have a lower boiling point than carbazole and which contain, as main components, anthracene and phenanthrene. This known process permits working under a vacuum during evaporation as well as during subsequent fractional condensation. This process operates continuously and the tar is completely evaporated.

In contrast hereto, no complete evaporation of the starting material takes place when proceeding according to the present invention. The present process operates discontinuously whereby "zone or layer evaporation" proceeds progressively with increasing boiling points but under very specific vacuum conditions, namely under a vacuum between about 200 mm. Hg/sq. cm. and about 250 mm. Hg/sq. cm. Under such pressure conditions satisfactory distillation without difficulty is possible because, as stated hereinabove, the tendency of anthracene and carbazole to sublime is reduced to such an extent that no clogging of the distillation and vacuum pipes takes place, while, at the same time, the temperature in the still is not high enough to cause substantial losses due to decomposition or coking. Maintaining such a specific sub-atmospheric pressure to prevent sublimation is not suggested in the above mentioned known distillation process and the problems involved in the distillation of a different starting material are solved by the process according to the present invention in a simple and effective manner. As stated above, only when proceeding according to the present invention, it is possible to produce high-grade anthracene and high-grade carbazole from an impure anthracene and high-grade carbazole from an impure anthracene starting material without subjecting such material to potassium hydroxide fusion.

Figure 2:
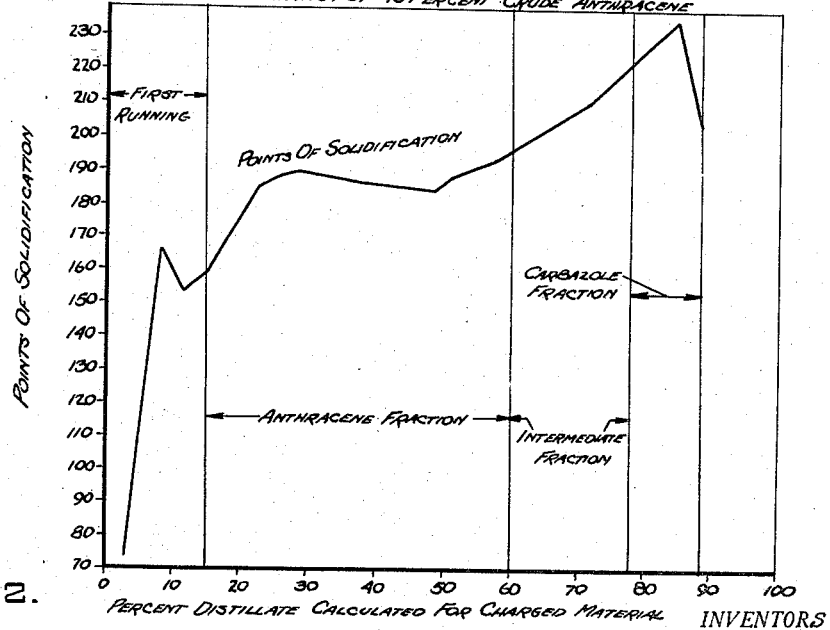

The attached drawings illustrate the course of fractional distillation of different starting materials according to the present invention. Thereby Fig. 1 illustrates the distillation of an anthracene residue obtained on working up coal tar anthracene oil in the usual manner by cooling, as described hereinafter in Example 1, and Fig. 2 illustrates the distillation of crude anthracene as described hereinafter in Example 2.

The following examples serve to illustrate the present invention without, however, limiting the same thereto.

*Example 1*

Anthracene residues containing about 25% of anthracene, between about 10% to about 15% of carbazole, and about 30% of phenanthrene are first distilled in a high vacuum of a few mm. Hg/sq. cm. and thereafter, as soon as the distillate shows a point of solidification of 160° C., at a lower vacuum of about 250 mm. Hg/sq. cm. at a reflux ratio of about 10:1 by means of a packed rectifying column operating with a plate efficiency of 20 theoretical plates. The first running collected on distillation in a high vacuum contains mainly fluorene and phenanthrene. It is collected until the point of solidification of the distillate has increased to about 160° C. After reducing the vacuum to 250 mm. Hg/sq. cm., an anthracene fraction within a range of points of solidification between 160° C. and 200° C. is collected. The following fraction within the range of points of solidification between 200° C. and 217° C. is subjected to redistillation. Thereafter, the carbazole fraction within a range of points of solidification between 217° C. ascending and 200° C. descending is also collected. The maximum of the curve of points of solidification of the carbazole fraction is at about 228° C. The chrysene fraction which passes over after the carbazole fraction is worked up to chrysene according to processes known per se.

The anthracene fraction amounts to about 28% of the starting material and contains about 65% of anthracene, the remainder being mostly phenanthrene. Since phenanthrene is considerably more soluble than anthracene, it is possible to produce substantially pure anthracene of an anthracene content of 95% and more in a simple manner by dissolving said fraction in the same amount of high-boiling pyridine bases (boiling between 150° C. and 170° C.) and allowing the solution to crystallize. The high-boiling pyridine bases are preferably removed from the centrifuged anthracene crystals by washing with a small amount of benzene or solvent naphtha. Silver-white crystals of anthracene are obtained in this manner in a yield of about 60% calculated for the anthracene fraction subjected to recrystallization.

The carbazole fraction amounts to about 10% of the anthracene residues subjected to the distillation process according to the present invention and contains about 85% of carbazole. High-boiling pyridine bases are unsuitable for its purification. Solvent naphtha (boiling between 150° C. and 180° C.) has proved to be an excellent solvent. 98% carbazole is obtained by dissolving the carbazole fraction in 4.5 times its amount of solvent naphtha and allowing the solution to crystallize. The yield of carbazole exceeds 80% calculated for the carbazole fraction subjected to recrystallization.

As shown in Fig. 1, fractional distillation of anthracene residues according to the present invention yields the following fractions:

| Fractions | Solidification point, °C. | Percent |
|---|---|---|
| (1) First running of phenanthrene and fluorene | <160 | 32 |
| (2) Anthracene fraction containing about 65% of anthracene | 160-200 | 28 |
| (3) Intermediate fraction (for redistillation) | 200-217 | 10 |
| (4) Carbazole fraction containing about 85% of carbazole | 217-228-200 | 10 |
| (5) Chrysene fraction | | 20 |

*Example 2*

Crude anthracene containing about 40% of anthracene is distilled under the same conditions as described hereinabove in Example 1 whereby a packed column operating with a plate efficiency of 18 theoretical plates is used. Only about 14% of a first running is obtained in a vacuum of about 25 mm. Hg/sq. cm. The vacuum is reduced to about 250 mm. Hg/sq. cm. and the anthracene fraction is collected within the range of points of solidification between 160° C. and 200° C. The yield is about 50%. An intermediate fraction distilling in the range of points of solidification between 200° C. and 226° C. is then collected and removed. Said fraction is added to a new charge for redistillation. Thereafter, the carbazole fraction is collected between a point of solidification of 226° C. ascending and 210° C. descending whereby the maximum point of solidification of the carbazole fraction is at 236° C. The yield of the carbazole fraction amounts to about 10%. Finally, the chrysene fraction is collected.

Working up of the various fractions is effected as described in the preceding Example 1.

As shown in Fig. 2, fractional distillation of crude anthracene according to the present invention yields the following fractions:

| Fractions | Solidification point, °C. | Percent |
|---|---|---|
| (1) First running of phenanthrene and fluorene | <160 | 14 |
| (2) Anthracene fraction containing about 65% of anthracene | 160-200 | 50 |
| (3) Intermediate fraction for redistillation | 200-226 | 14 |
| (4) Carbazole fraction containing about 85% of carbazole | 226-236-210 | 10 |
| (5) Chrysene fraction | | 12 |

It is, of course, understood that other anthracene and carbazole containing starting materials than those employed in the preceding examples as obtained when working up coal tar products containing such compounds, can also be used for the purpose of the present invention.

Separation of the anthracene and carbazole fractions by determining the point of solidification of the distillate is a preferred feature of the present invention since it permits to very sharply determine the range within which the two fractions are to be collected. Ordinarily the fractions obtained in the distillation of coal tar products are collected either according to their boiling point or according to their specific gravity. Both methods, however, do not permit separation of the anthracene fraction and the carbazole fraction in such a manner that optimum yields are obtained. When proceeding according to said conventional methods, it is also not possible to work up the resulting fractions to substantially pure anthracene and carbazole by a single recrystallization step. Furthermore, as stated hereinabove, the point of solidification can be determined much more exactly than the boiling point or the specific gravity of the distillate.

As is evident from the examples, the anthracene fraction is preferably collected within the range of linear ascent of the curve of points of solidification at a point starting with 160° C. and until the point of solidification has reached 200° C. The carbazole fraction which is characterized by a maximum of its curve of points of solidification is preferably collected in such a manner that collection is started as soon as the point of solidification of the distillate within the ascending range of the curve of points of solidification has reached a point about 10° C. below the maximum point of solidification. Collection of the carbazole fraction is discontinued as soon as the point of solidification has decreased to a point about 25° C. to 30° C. below the maximum point of solidification. When following these rules, optimum yields of anthracene and carbazole are obtained. The intermediate fraction distilling between the anthracene fraction and the carbazole fraction is ordinarily quite small and is preferably added to a new charge for further separation by redistillation.

Of course, many changes and variations in the starting materials, the type of rectifying column, whether packed columns or bubble-cap plate towers or sieve-plate towers are used, the solvents employed for purifying the anthracene and carbazole fractions, and the like may be made by those skilled in the art in accordance with the principles set forth herein and in the claims annexed hereto.

We claim:
1. In a process of separating anthracene and carbazole by fractional distillation of anthracene residues containing anthracene, carbazole, and phenanthrene and of crude anthracene, the steps which comprise subjecting such starting materials to fractional vacuum distillation under a vacuum between about 200 mm. Hg/sq. cm. and about 250 mm. Hg/sq. cm. and fractionally condensing the distilled vapors to separate them into an anthracene fraction and a carbazole fraction.

2. In a process of separating anthracene and carbazole by fractional distillation of anthracene residues containing anthracene, carbazole and phenanthrene and of crude anthracene, the steps which comprise distilling off the phenanthrene fraction as first running under a vacuum not exceeding 50 mm. Hg/sq. cm., decreasing the vacuum to a vacuum between about 200 mm. Hg/sq. cm. and about 250 mm. Hg/sq. cm., fractionally distilling the residue under said vacuum, and fractionally condensing the distilled vapors to separate them into an anthracene fraction and a carbazole fraction.

3. In a process of separating anthracene and carbazole by fractional distillation of anthracene residues containing anthracene, carbazole, and phenanthrene and of crude anthracene, the steps which comprise subjecting such starting materials to fractional vacuum distillation under a vacuum between about 200 mm. Hg/sq. cm. and about 250 mm. Hg/sq. cm., fractionally condensing the anthracene fraction by determining the points of solidification of the condensed distillate and collecting the condensed fraction according to its points of solidification within the range of the ascending curve between a point of solidification of about 160° C. and a point of solidification of about 200° C., continuing fractional distillation under said vacuum between about 200 mm. Hg/sq. cm. and about 250 mm. Hg/sq. cm., and fractionally condensing the carbazole fraction by determining the points of solidification of the condensed distillate, starting collection of the condensed distillate at a point of solidification about 10° C. lower than the maximum point of solidification of said carbazole fraction, and discontinuing collection of the condensed distillate at a point of solidification between about 25° C. and about 30° C. lower than the maximum point of solidification of said carbazole fraction, after said maximum point of solidification has been reached.

4. The process according to claim 1, wherein the resulting anthracene fraction is dissolved in pyridine bases having a higher boiling point than pyridine and the resulting solution is allowed to crystallize to yield anthracene containing at least 95% of anthracene.

5. The process according to claim 3, wherein the resulting anthracene fraction is dissolved in pyridine bases having a higher boiling point than pyridine and the resulting solution is allowed to crystallize to yield anthracene containing at least 95% of anthracene.

References Cited in the file of this patent

UNITED STATES PATENTS

| | | |
|---|---|---|
| 1,409,897 | Murphy et al. | Mar. 14, 1922 |
| 1,831,059 | Daniels | Nov. 10, 1931 |
| 2,767,232 | Kleiss et al. | Oct. 16, 1956 |
| 2,783,287 | Nickolls et al. | Feb. 26, 1957 |
| 2,795,538 | Ratte et al. | June 11, 1957 |

FOREIGN PATENTS

| | | |
|---|---|---|
| 364,629 | Great Britain | Jan. 4, 1932 |